US008959955B2

(12) United States Patent
Ota

(10) Patent No.: US 8,959,955 B2
(45) Date of Patent: Feb. 24, 2015

(54) PULSE LASER DEVICE, TRANSPARENT MEMBER WELDING METHOD AND TRANSPARENT MEMBER WELDING APPARATUS

(75) Inventor: Michiharu Ota, Kariya (JP)

(73) Assignee: Aisin Seiki Kabushiki Kaisha, Aichi-ken (JP)

(*) Notice: Subject to any disclaimer, the term of this patent is extended or adjusted under 35 U.S.C. 154(b) by 281 days.

(21) Appl. No.: 13/635,471

(22) PCT Filed: Mar. 14, 2011

(86) PCT No.: PCT/JP2011/056520
§ 371 (c)(1),
(2), (4) Date: Sep. 17, 2012

(87) PCT Pub. No.: WO2011/115243
PCT Pub. Date: Sep. 22, 2011

(65) Prior Publication Data
US 2013/0008880 A1    Jan. 10, 2013

(30) Foreign Application Priority Data

Mar. 16, 2010 (JP) ................................. 2010-058722

(51) Int. Cl.
*C03B 23/20* (2006.01)
*B23K 26/324* (2014.01)
(Continued)

(52) U.S. Cl.
CPC ........... *B23K 26/3266* (2013.01); *B23K 26/324* (2013.01); *B23K 26/0635* (2013.01); *C03B 23/20* (2013.01); *B23K 26/0652* (2013.01); *B23K 26/20* (2013.01)
USPC ................... 65/36; 65/152; 264/482; 372/25; 219/121.63; 219/121.64; 219/121.77

(58) Field of Classification Search
CPC .............................. C03B 23/20; B23K 26/324
USPC ............... 65/17.1, 36, 58, 152, 269; 264/482; 156/272.8; 372/25; 219/121.63, 219/121.64, 121.77
See application file for complete search history.

(56) References Cited

U.S. PATENT DOCUMENTS 5,489,321 A * 2/1996 Tracy et al. .................. 65/43
6,845,635 B2 * 1/2005 Watanabe et al. ............ 65/30.14
(Continued)

FOREIGN PATENT DOCUMENTS

CN 1867419 A 11/2006
CN 101155162 A 4/2008
(Continued)

OTHER PUBLICATIONS

Korean Official Letter, dated Dec. 19, 2013, issued in counterpart Korean Patent Application No. 10-2012-7026841.
(Continued)

*Primary Examiner* — Samuel M Heinrich
(74) *Attorney, Agent, or Firm* — Sughrue Mion, PLLC

(57) ABSTRACT

An inexpensive pulse laser device that outputs a laser pulse capable of welding a transparent member is provided. There is provided a pulse laser device including: a laser light source 1 that outputs a repeated pulse laser; a demultiplexer 2 that demultiplexes the pulse laser output from the laser light source 1 into two pulse lasers; first pulse train generation means 3 that generates a first pulse train by changing at least a peak power and/or a pulse width of one of the two pulse lasers demultiplexed by the demultiplexer 2; and a multiplexer 4 that multiplexes the other of the two pulse lasers demultiplexed by the demultiplexer 2 and the first pulse train generated by the first pulse train generation means 3, in which a pulse laser in which a low-peak power pulse laser is superimposed on a high-peak power ultra-short pulse laser is output.

12 Claims, 12 Drawing Sheets

(51) Int. Cl.
*B23K 26/32* (2014.01)
*B23K 26/06* (2014.01)
*B23K 26/20* (2014.01)

(56) References Cited

U.S. PATENT DOCUMENTS

| | | | |
|---|---|---|---|
| 7,491,909 | B2 | 2/2009 | Yamamoto et al. |
| 7,804,864 | B2 | 9/2010 | Gu et al. |
| 2004/0134894 | A1 | 7/2004 | Gu et al. |
| 2008/0080859 | A1 | 4/2008 | Kagawa |
| 2012/0260847 | A1* | 10/2012 | Van Der Wilt ............ 117/37 |

FOREIGN PATENT DOCUMENTS

| | | |
|---|---|---|
| JP | 11-221684 A | 8/1999 |
| JP | 2004-351466 A | 12/2004 |
| JP | 2005-001172 A | 1/2005 |
| JP | 2005-152960 A | 6/2005 |
| JP | 2006-130515 A | 5/2006 |
| JP | 2006-212646 A | 8/2006 |
| JP | 2007-532005 A | 11/2007 |
| JP | 2008-062263 A | 3/2008 |
| JP | 2008-205486 A | 9/2008 |
| KR | 10-2006-0130560 | 12/2006 |
| WO | 2005/038994 A2 | 4/2005 |

OTHER PUBLICATIONS

Horn, Alexander, et al., "Investigations on Melting and Welding of Glass by Ultra-short Laser Radiation," Journal of Laser Micro/Nanoengineeing, 2008, pp. 114-118, vol. 3, No. 2.

Lin, Cheng-Hsiang, et al., "Investigations of femtosecond-nanosecond dual-beam laser ablation of dielectrics," Optics Letters, Jul. 15, 2010, pp. 2490, vol. 35, No. 14.

Miyamoto, Isamu, et al., "Local Melting of Glass Material and Its Application to Direct Fusion Welding by Ps-laser Pulses," Journal of Laser/Micro/Nanoengineering, 2007, pp. 7-14, vol. 2, No. 1.

Yahng, J.S., et al., "Nonlinear enhancement of femtosecond laser ablation efficiency by hybridization with nanosecond laser," Optics Express, Oct. 2, 2006, pp. 9544-9550, vol. 14, No. 20.

International Search Report for PCT/JP2011/056520, dated Jun. 14, 2011.

International Preliminary Report on Patentability dated Sep. 18, 2012 issued in PCT/JP2011/056520.

Chinese Office Action issued in Chinese Application No. 201180013839.3 dated Mar. 20, 2014.

\* cited by examiner

PULSE LASER DEVICE, TRANSPARENT MEMBER WELDING METHOD AND TRANSPARENT MEMBER WELDING APPARATUS

CROSS REFERENCE TO RELATED APPLICATIONS

This application is a National Stage of International Application No. PCT/JP2011/056520, filed on Mar. 14, 2011, which claims priority from Japanese Patent Application No. 2010-058722, filed Mar. 16, 2010, the contents of all of which are incorporated herein by reference in their entirety.

TECHNICAL FIELD

The present invention relates to a laser device that outputs a high-peak power short pulse laser and a transparent member welding method and a transparent member welding apparatus using the laser device. More particularly, the present invention relates to a pulse laser device that outputs a pulse laser obtained by superimposing a repeated low-peak power pulse laser on a repeated high-peak power ultra-short pulse laser and a transparent member welding method and a transparent member welding apparatus using the laser device.

BACKGROUND ART

High power short pulse laser devices are practically important in various fields. In particular, a high-peak power ultra-short pulse laser having a high peak power is practically used for processing a transparent material and medical treatment in medicine and industry.

The high-peak power ultra-short pulse laser device that has been practically used modulates a highly repeated frequency laser pulse train output from a mode-locked fiber laser oscillator into a low repeated frequency laser pulse with a light modulator, and thereafter amplifies the laser pulse train (for example, see patent document 1).

In the application of processing, attention has been focused on the cutting of a transparent material (such as glass or sapphire) by the high-peak power ultra-short pulse laser described above (for example, see patent document 2).

Recently, a method of focusing and irradiating a high-peak power ultra-short pulse laser to inside portions of a transparent member in contact with each other and causing multiphoton absorption to perform welding has been developed (for example, see patent document 3).

PRIOR ART DOCUMENT

Patent Document

[Patent document 1] Japanese Patent Application Laid-open No. 2007-532005
[Patent document 2] Japanese Patent Application Laid-open No. 2004-351466
[Patent document 3] Japanese Patent Application Laid-open No. 2005-1172

SUMMARY OF INVENTION

In the cutting of the transparent material described above, multiphoton absorption caused by a high-peak power ultra-short pulse laser in which its pulse width ranges from the order of picoseconds to the order of femtoseconds, its pulse energy is of the order of microjoules and its peak power ranges from the order of megawatts to the order of gigawatts is utilized, and thus a crack is produced to perform the cutting.

In the welding of a transparent material recently developed, a high-peak power ultra-short pulse laser is focused and irradiated into the interfacial portion of the transparent members in contact with each other to cause multiphoton absorption.

Although, until now, a transparent material such as glass has been able to be cut utilizing multiphoton absorption caused by a high-peak power ultra-short pulse laser, it is difficult to perform satisfactory welding that causes no crack and has a high welding strength. When a high-peak power ultra-short pulse laser is irradiated to the interface of a transparent body materials, if even a slight gap (200 nm or less) is present in the interface, a crack is produced in the interface or the abrasion of the interface only occurs and welding is not achieved. In other words, in order to perform welding only with a high-peak power ultra-short pulse laser which is characterized by non-thermal processing and in which its pulse width ranges from the order of picoseconds to the order of femtoseconds, it is necessary to produce a state where the interfaces of the transparent body materials are in optical contact with each other. Hence, it is possible to perform welding using only a high-peak power ultra-short pulse laser, only in a highly limited state (a state in optical contact). It is therefore impractical to put, to practical use, welding using only a high-peak power ultra-short pulse laser. If welding can be performed with the interfaces of the transparent body in optical contact (a gap between the interfaces: 150 nm or less), when only a high-peak power ultra-short pulse laser is irradiated, the distance of propagation of heat caused by the irradiation is so short that the difference of temperatures between the irradiation portion and its vicinity is rapidly increased. Hence, the energy or the fluence of a laser that can be irradiated is limited. For example, if the energy or the fluence of a laser is increased beyond necessity in order to increase the bead width of welding, a crack is produced to lower the welding strength.

Even if only a long pulse laser (for example, a nanosecond laser) characterized by thermal processing is used to selectively melt the interface of transparent body materials and perform welding, since the long pulse laser mainly has linear absorption as absorption, it is impossible to weld only the interface. In other words, since the long pulse laser is absorbed not only by the interface but also by the surface or the entire material, it is impossible to weld the transparent body material only with the long pulse laser. In order to solve this problem, a method is proposed of coating the interface of a transparent body material with a laser absorbing material and performing welding. In other words, this method is a method of irradiating a nanosecond laser to the coating material, melting an absorption material and thereby performing welding. However, this method is complicated, and causes the welding cost to be increased.

The present invention is made in view of the foregoing problems of the conventional technology described above; an object of the present invention is to provide an inexpensive pulse laser device that outputs a laser pulse capable of welding a transparent material.

Another object of the present invention is to provide a transparent member welding method and a transparent member welding apparatus that can perform satisfactory welding that causes no crack or reduced crack and has a high welding strength.

To solve the above problem, according to the present invention, there is provided a pulse laser device including: a laser light source that outputs a repeated pulse laser; a demultiplexer that demultiplexes the pulse laser output from the laser light source into two pulse lasers; first pulse train generation means that generates a first pulse train by changing at least a peak power and/or a pulse width of one of the two pulse lasers demultiplexed by the demultiplexer; and a multiplexer that multiplexes the other of the two pulse lasers demultiplexed by the demultiplexer and the first pulse train generated by the first pulse train generation means, in which a pulse laser in which a repeated low-peak power pulse laser is superimposed on a repeated high-peak power ultra-short pulse laser is output.

The laser light source is used as a laser light source that outputs a long pulse laser of a low repeated frequency, the pulse width is expanded by the first pulse train generation means, multiplexing is performed by the multiplexer and then amplification and compression are performed, with the result that the pulse laser (two types of pulse trains are superimposed in terms of space and time) in which the repeated low-peak power pulse laser is superimposed on the repeated high-peak power ultra-short pulse laser can be output.

A modification process by multiphoton absorption with the high-peak power ultra-short pulse laser and a melting process by the heat accumulation effects of the low-peak power pulse laser are performed chronologically, and thus it is possible to weld the transparent material without the occurrence of a crack.

In the pulse laser device described above, second pulse train generation means that generates a second pulse train by changing at least a peak power and/or a pulse width of the other of the two pulse lasers demultiplexed by the demultiplexer may be included before the multiplexer.

The laser light source is used as a laser light source that outputs a long pulse laser of a low repeated frequency, the pulse width is expanded and amplified by the first pulse train generation means, and is amplified and compressed by the second pulse train generation means and multiplexing is performed by the multiplexer, with the result that the pulse laser in which the repeated low-peak power pulse laser is superimposed on the repeated high-peak power ultra-short pulse laser can be output.

The first pulse train generation means preferably includes a first optical modulator that changes a repeated frequency of the pulse laser output from the laser light source into a repeated frequency lower than the repeated frequency.

Since the repeated frequency of the first pulse train is low, it becomes difficult for the saturation of an amplifier increasing the peak power to occur. Hence, a laser light source is used as a laser light source that outputs a highly repeated short pulse laser, and thus a pulse laser in which a highly repeated low-peak power short pulse laser is superimposed on a low repeated high-peak power ultra-short pulse laser can be output.

The second pulse train generation means preferably includes a second optical modulator that changes a repeated frequency of the short pulse laser output from the laser light source into a repeated frequency lower than the repeated frequency.

Since the repeated frequency of the second pulse train is low, it becomes difficult for the saturation of an amplifier increasing the peak power to occur. Hence, a laser light source is used as a laser light source that outputs a highly repeated short pulse laser, and thus a pulse laser in which a highly repeated low-peak power short pulse laser is superimposed on a low repeated high-peak power ultra-short pulse laser can be output.

Preferably, at least one of the first pulse train generation means and the second pulse train generation means includes an expander, and further includes, after the multiplexer, chirp adjustment means that adjusts chirp.

Since at least one of the first pulse train generation means and the second pulse train generation means includes the expander, it is possible to reduce the saturation of an amplifier increasing the peak power. Since chirp adjustment means is included, it is possible to compress the pulse time width by adjusting the chirp of at least one of the first pulse train and the second pulse train.

The first optical modulator preferably changes the repeated frequency into a repeated frequency lower than the repeated frequency of the second optical modulator.

The first pulse train can be used for performing modification; the second pulse train can be used for performing melting.

The first optical modulator preferably changes the repeated frequency into a repeated frequency of 1 MHz or less.

Since the interval between the pulses is more than 1 μsec., even if the succeeding pulse is irradiated to a region where the modification has been performed by the preceding pulse, it is difficult for a damage such as abrasion to occur.

The second optical modulator preferably changes the repeated frequency into a repeated frequency equal to or more than a repeated frequency of the first pulse train.

Between the pulses of the first pulse train, at least one of the pulses of the second pulse train can be arranged. Consequently, the modification is performed by multiphoton absorption with the pulses of the first pulse train, and thereafter heating can be performed by at least one of the pulses of the second pulse train.

To solve the above problem, according to the present invention, there is provided a transparent member welding method including: a laser output step of outputting a pulse laser in which a repeated low-peak power pulse laser is superimposed on a repeated high-peak power ultra-short pulse laser, from a pulse laser device including: a laser light source that outputs a repeated pulse laser; a demultiplexer that demultiplexes the pulse laser output from the laser light source into two pulse lasers; first pulse train generation means that generates a first pulse train by changing at least a peak power and/or a pulse width of one of the two pulse lasers demultiplexed by the demultiplexer; and a multiplexer that multiplexes the other of the two pulse lasers demultiplexed by the demultiplexer and the first pulse train generated by the first pulse train generation means; an irradiation step of focusing and irradiating the pulse laser in which the repeated low-peak power pulse laser is superimposed on the repeated high-peak power ultra-short pulse laser output in the laser output step, in a vicinity of a contact portion of two members transparent to a wavelength of the laser; a modification step of modification of the vicinity of the contact portion by multiphoton absorption with the high-peak power ultra-short pulse laser; and a melting step of melting, with the low-peak power pulse laser, the vicinity of the contact portion where modification has been performed in the modification step.

In the transparent member welding method described above, second pulse train generation means that generates a second pulse train by changing at least a peak power and/or a pulse width of the other of the two pulse lasers demultiplexed by the demultiplexer is preferably included before the multiplexer.

To solve the above problem, according to the present invention, there is provided a transparent member welding apparatus including: a pulse laser device which includes: a laser light source that outputs a repeated pulse laser; a demultiplexer that demultiplexes the pulse laser output from the laser light source into two pulse lasers; first pulse train generation means that generates a first pulse train by changing at least a peak power and/or a pulse width of one of the two pulse lasers demultiplexed by the demultiplexer; and a multiplexer that multiplexes the other of the two pulse lasers demultiplexed by the demultiplexer and the first pulse train generated by the first pulse train generation means, and which outputs a pulse laser in which a repeated low-peak power pulse laser is superimposed on a repeated high-peak power ultra-short pulse laser; a collective lens which focuses the pulse laser in which the repeated low-peak power pulse laser is superimposed on the repeated high-peak power ultra-short pulse laser output from the pulse laser device, in a vicinity of a contact portion of two members transparent to a wavelength of the laser and which forms a focused spot; and a stage which scans the focused spot.

In the transparent member welding apparatus described above, second pulse train generation means that generates a second pulse train by changing at least a peak power and/or a pulse width of the other of the two pulse lasers demultiplexed by the demultiplexer is preferably included before the multiplexer.

The laser light source is used as a laser light source that outputs a long pulse laser of a low repeated frequency, the pulse width is expanded by the first pulse train generation means, multiplexing is performed by the multiplexer and then amplification and compression are performed, with the result that the pulse laser (two types of pulse trains are superimposed in terms of space and time) in which the repeated low-peak power pulse laser is superimposed on the repeated high-peak power ultra-short pulse laser can be output.

A modification process by multiphoton absorption with the high-peak power ultra-short pulse laser and a melting process by the heat accumulation effects of the low-peak power pulse laser are performed chronologically, and thus it is possible to weld the transparent material without the occurrence of a crack or with the occurrence of the crack reduced.

DESCRIPTION OF EMBODIMENTS

Embodiments of the present invention will be described in detail below with reference to accompanying drawings.

First Embodiment

Figure 1:
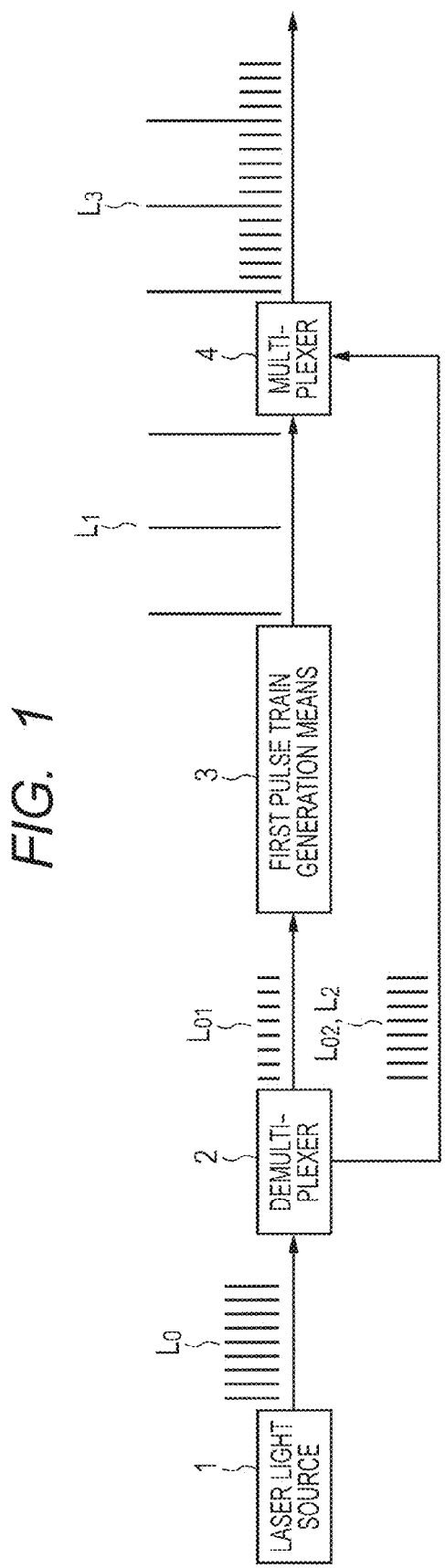
FIG. 1 is a block diagram of a pulse laser device of a first embodiment.

As shown in FIG. 1, the pulse laser device of the present embodiment includes: a laser light source 1 that outputs a repeated short pulse laser (seed pulse train) L0; a demultiplexer 2 that demultiplexes the seed pulse train L0 output from the laser light source 1 into two short pulse lasers (first seed pulse train L01, second seed pulse train L02); first pulse train generation means 3 that changes the repeated frequency and the peak power of the first seed pulse train L01 demultiplexed by the demultiplexer 2 to generate a first pulse train L1; and a multiplexer 4 that multiplexes the second seed pulse train L02 demultiplexed by the demultiplexer 2 and the first pulse train L1 generated by the first pulse train generation means 3.

Figure 2:
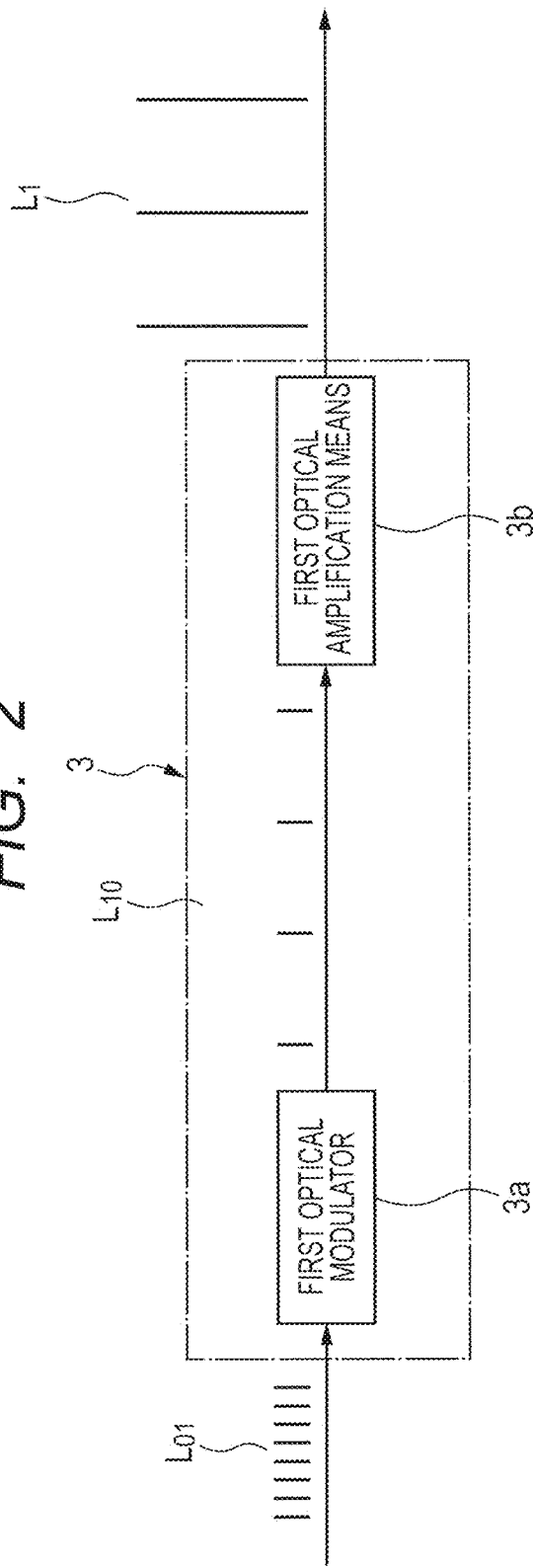
FIG. 2 is a detailed block diagram of first pulse train generation means of FIG. 1.

As shown in FIG. 2, the first pulse train generation means 3 includes: a first optical modulator 3a that changes the repeated frequency f0 of the first seed pulse train L01 into a frequency f1 which is lower than f0; and first optical amplification means 3b that amplifies the peak power P01 of the first seed pulse train L01 to a peak power P1 which is greater than P01.

As the laser light source 1, a mode-locked fiber laser, a mode-locked titanium sapphire laser, a Q switch laser or the like can be used. However, a mode-locked fiber laser is preferably used in terms of the reduction in the size of the device as a whole and high reliability.

As the demultiplexer 2, a fiber demultiplexer, a beam splitter, a half mirror or the like can be used.

As the first optical modulator 3a, an acousto-optic modulator (AOM), an electro-optic modulator (EOM), a magneto-optic modulator (MOM) or the like can be used.

The first optical amplification means 3b includes an optical amplifier. When the optical amplifier is a fiber amplifier, an expander that expands a pulse is preferably included before the fiber amplifier in order to prevent saturation. As the expander, an optical element, such as a fiber, a chirped grating or a chirped fiber grating, that chirps the incident optical pulse and expands the pulse width is used.

As the multiplexer 4, a fiber multiplexer, a beam splitter, a half mirror or the like can be used.

The operation of the pulse laser device of the present embodiment will now be described. The seed pulse train L0 of the peak power P0 and the repeated frequency f0 output from the laser light source 1 is demultiplexed by the demultiplexer 2 into the first seed pulse train L01 of the peak power P01 and the repeated frequency f0 and a second seed pulse train L02 of a peak power P02 and the repeated frequency f0.

The pulses of the first seed pulse train L01 are thinned out by the first optical modulator 3a, and thus the first seed pulse train L01 is changed into a pulse train L10 of a repeated frequency f1 (<f0).

The pulse train L10 is amplified by the first optical amplification means 3b into the first pulse train L1 of the peak power P1 (>P0).

The first pulse train L1 and the second seed pulse L02 are multiplexed by the multiplexer 4 into a pulse train L3 in which the second seed pulse L02 is superimposed on the first pulse train L1.

In the present embodiment, as the laser light source 1, a femtosecond pulse laser oscillator is used that outputs the seed pulse train L0 of the repeated frequency f0=5 MHz, the pulse width T0=150 fs and the peak power P0=1.33 MW (the average power Pm=1 W).

When, as the demultiplexer 2, a demultiplexer that performs demultiplexing in a ratio of 20:80 is used, the peak power P01 of the first seed pulse train L01 is 0.27 MW, and the peak power P02 of the second seed pulse train L02 is 1.1 MW.

When, as the first optical modulator 3a, a modulator that thins out the repeated frequency f0=5 MHz of the seed pulse train L0 into 1 MHz is used, the repeated frequency f10 of the pulse train L10 becomes equal to 1 MHz.

When, as the first optical amplification means 3b, an amplifier having an amplification of 100 is used, the peak power P1 of the first pulse train L1 becomes equal to 270 MW.

Therefore, the pulse train L3 output from the pulse laser device of the present embodiment is a pulse train in which the second seed pulse train L02 (second pulse train L2) of the repeated frequency f0=5 MHz and the peak power P02=1.1 MW is superimposed on the first pulse train L1 of the repeated frequency f10=1 MHz and the peak power P1=270 MW.

In order to directly and easily weld, in the welding of transparent body materials, the interface of the transparent body material without the use of an expensive absorption agent, the following is preferably performed.

Specifically, first, the the material modification is performed (the refractive index or the like is changed) by multiphoton absorption with a high-peak power ultra-short pulse laser so that the laser light can be absorbed. Thereafter, the transparent material is heated and melted by a heat accumulation effect caused by a long pulse laser without being absorbed in a normal state (before modification) or a low-peak power highly repeated short pulse laser, and thus the transparent material is welded. Hence, in the laser welding or the like of the transparent material, two processing processes, that is, a material modification (the refractive index or the like is changed) process by multiphoton absorption and a melting process by the heat accumulation effect of multiple pulses or a long pulse, are required.

In a conventional pulse laser device, a high-peak power ultra-short pulse laser that changes operational conditions to cause multiphoton absorption and a low-peak power pulse laser that causes melting by accumulated heat are generated, and it is necessary to irradiate two lasers separately.

However, it is reported that the refractive index of the transparent material that has been modified by multiphoton absorption returns to its original refractive index on the order of several microseconds (see JLMN-Journal of Laser Micro/Nanoengineering Vol. 3, No. 2, 2008, by Alexander Horn et al.). It is also reported that the absorption rate of a material is transiently increased by optical ionization caused by the irradiation of an ultra-short pulse laser (see Local Melting of Glass Material and Its Application to Direct Fusion Welding by Ps-laser Pulses Isamu MIYAMOTO*, Alexander HORN, Jens GOTTMANN JLMN-Journal of Laser Micro/Nanoengineering Vol. 2, No. 1, 2007). Another literature discloses that, in the processing of a material surface, the duration of transient change of an absorption rate caused by the irradiation of an ultra-short pulse laser is several tens of nanoseconds at most (see Investigations of femtosecond-nanosecond dual-beam laser ablation of dielectrics 2490 OPTICS LETTERS/Vol. 35, No. 14/Jul. 15, 2010). A method is disclosed of making a permanent material modification such as cracking or discoloration on a material by the irradiation of a femtosecond laser, then irradiating a long pulse laser and thereby enhancing the welding strength (see Japanese Patent Application Laid-open No. 2005-1172). In this method, when a glass that does not cause at least a darkening phenomenon is used, it is impossible to expect a raid increase in the absorption rate. Hence, this method is not effective for a glass that causes no darkening phenomenon. For this reason, although, as described above, it is necessary to irradiate a low-peak power short pulse laser immediately after a high-peak power ultra-short pulse laser, it is difficult to realize it.

Hence, in order for the pulse laser device described above to perform the two processing processes, it is necessary to synchronize and use a laser device that outputs a high-peak power ultra-short pulse laser of a low repeated frequency and a laser device that outputs a low-peak power short pulse laser of a high to low repeated frequency. In addition, the lasers output from these two laser devices need to be superimposed in terms of space and time.

By contrast, the pulse laser device of the present embodiment outputs the pulse train L3 in which the second seed pulse train L02 (second pulse train L2) of the repeated frequency f0=5 MHz and the peak power P02=1.1 MW is superimposed on the first pulse train L1 of the repeated frequency f10=1 MHz and the peak power P1=270 MW. Hence, as will be described below, it is possible to perform modification with the first pulse train L1 and heat and melt the transparent material with the second pulse train L2, and thereby weld it.

Figure 3:
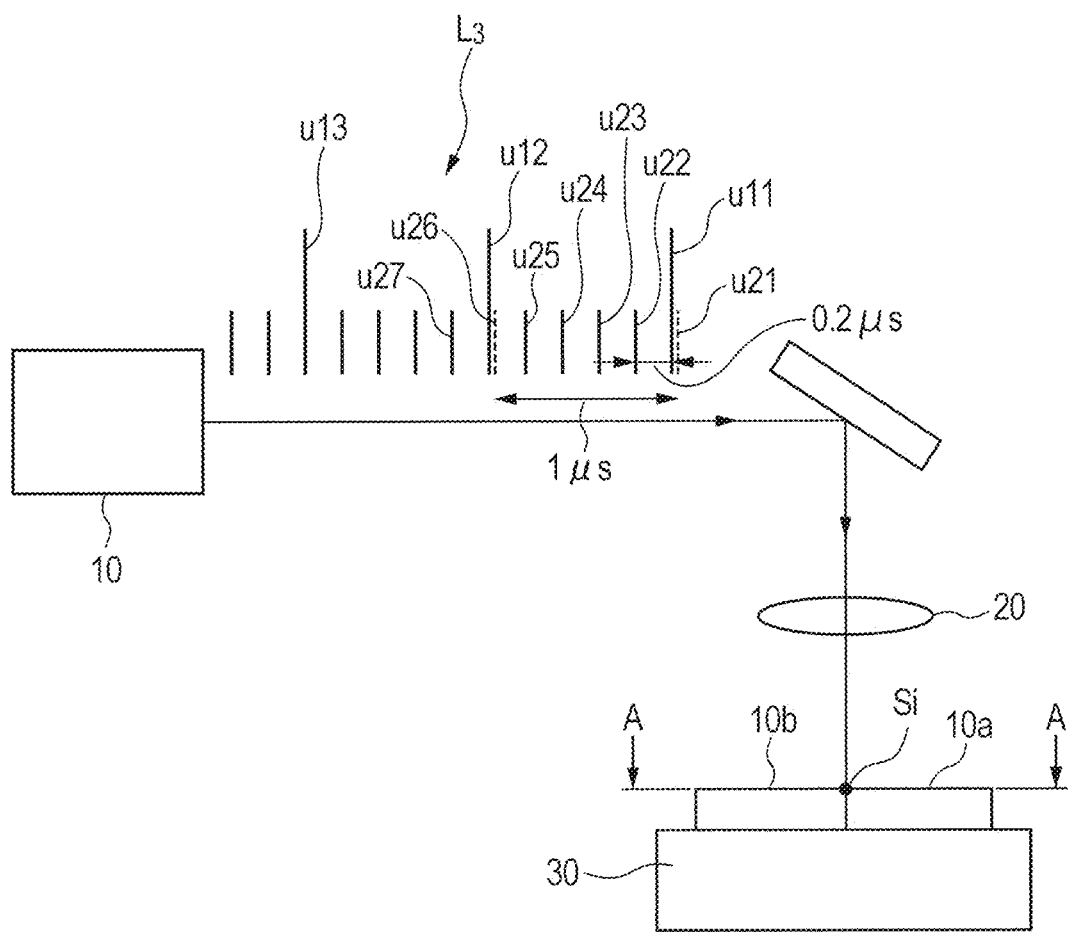
FIG. 3 is a schematic diagram showing the configuration of a transparent member welding apparatus including the pulse laser device of the first embodiment.
Figure 4:
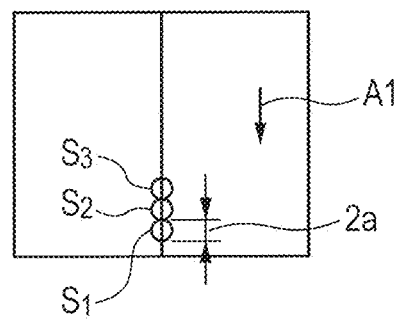
FIG. 4 is a cross-sectional view taken along line A-A of FIG. 3.

FIG. 3 is a schematic diagram showing the configuration of a transparent member welding apparatus. The transparent member welding apparatus includes: the pulse laser device 10 of the present embodiment; a collective lens 20 that collects a pulse laser output from the pulse laser device 10 in the vicinity of a portion where quartz glasses 10a and 10b meet each other and thereby forms a focused spot Si; and a stage 30 that scans the focused spot Si. FIG. 4 is a cross-sectional view taken along line A-A of FIG. 3. The method of welding the transparent member will be described below with reference to FIGS. 3 and 4.

In the pulse laser device 10 of the present embodiment, the first pulse train L1 and the second pulse train L2 differ slightly in the optical path, and thus the first pulse train L1 and the second pulse train L2 are in phase. Hence, as schematically shown in FIG. 3, in the pulse train L3, the front pulse u11 of the first pulse train L1 is overlaid on the front pulse u21 of the second pulse train L2. When they are different in the optical path and are out of phase, an optical delay line is inserted into the shorter optical path, and thus the optical path is expanded.

Since the repeated frequency f10 of the first pulse train L1 is 1 MHz, the pulse interval of the first pulse train L1 is 1 μsec.

Since the repeated frequency f20 of the second pulse train L2 is f0=5 MHz, the pulse interval of the second pulse train L2 is 0.2 μsec. Hence, between the pulses of the first pulse train L1 (for example, between u11 and u12), four pulses (for example, u22, u23, u24 and u25) of the second pulse train L2 are arranged.

Circular spots Si (i=1, 2, 3, ...) of FIG. 4 indicate the focused spots made by the lens 20; S1 represents the focused spot of the pulse u11 of the first pulse train L1, S2 represents the focused spot of the pulse u12, .... The pulse interval (for example, the time interval of u11 and u12) of the first pulse train L1 is 1 μs; since a relaxation time of modification by multiphoton absorption is several microseconds, when the focused spots S1 and S2, S2 and S3, ... are overlaid, the next pulse of the first pulse train L1 is irradiated before the relaxation of the modification, with the result that damage such as abrasion may be produced. Hence, as shown in FIG. 4, the irradiation is preferably performed such that the focused spots S1 and S2, S2 and S3, ... are not overlaid.

Although the diameter 2a of the spot Si changes with the focal distance of the lens 20, it is impossible to reduce the diameter to a diffraction limited or less. When the wavelength of the laser is set at 1 μm, which is common for a high power ultra-short pulse laser, the diameter 2a is 1 μm or less. Hence, in order to form the focused spots (adjacent spots in contact with each other) as shown in FIG. 4, it is necessary to scan the glasses 10a and 10b in a direction indicated by an arrow A1 at a rate of 1 m/s.

The operation of performing welding with the quartz glasses 10a and 10b meeting each other under the conditions described above will be described. First, the quartz glasses 10a and 10b are moved in the direction indicated by the arrow A1 at the rate of 1 m/s, and at the same time, the pulse train L3 is irradiated. Then, the pulse u11 of the peak power P1=270 MW and the pulse width τ0=150 fs and the pulse u21 of the peak power P02=1.1 MW are collected in the spot S1, and thus the modification of the region is performed by multiphoton absorption. After the elapse of 0.2 μs, the pulse u22 of the peak power P02=1.1 MW is collected in the modified spot S1 (specifically, a position displaced 0.2 μm), and is linearly absorbed (since the modification has been performed). The absorbed energy is changed into heat and is accumulated. Then, after the elapse of 0.2 μs, the pulse u23 of the peak power P02=1.1 MW is collected, and is linearly absorbed. Then, after the elapse of 0.2 μs, the pulse u24 of the peak power P02=1.1 MW is collected, and is linearly absorbed. Then, after the elapse of 0.2 μs, the pulse u25 of the peak power P02=1.1 MW is collected, and is linearly absorbed. Then, after the elapse of 0.2 μs, the pulse u12 of the peak power P1=270 MW and the pulse width τ0=150 fs and the pulse u26 of the peak power P02=1.1 MW are collected in the spot S2, and thus the modification of the region is performed by multiphoton absorption. Thereafter, the same operation is repeated. The heat of the pulses u22, u23, u24 and u25 is accumulated, the glasses are softened and melted and the meeting portion is joined.

The pulse interval of the first pulse train L1 is 1 μs; since it is shorter than the time (several microseconds) for relaxation of modification, it is necessary to perform scanning at a high speed (in the above case, 1 m/sec.) so that the spots are prevented from being overlaid. When the scanning is performed at a high speed, the positions in which the pulses u22, 24, ... of the second pulse train L2 are collected are displaced significantly (in the above case, 0.2 μm), and thus it is difficult to obtain effective heat accumulation effects.

When the pulse interval of the first pulse train L1 is set at several microseconds or more, even if the next pulse is collected in a region where the modification is performed by the first pulse, since the modification has been relaxed, a low-speed scanning may be performed, and, in an extreme case, it is not necessary to perform scanning. The time for relaxing the modification of the material is generally several microseconds or less. Hence, in order to effectively repeat the modification of the material by the L1 pulse and the heat accumulation by the L2 pulse, it is preferable that the interval of the L1 pulse be substantially equal to the relaxation time for the modification of the material. Therefore, the repeated frequency f10 of the first pulse train L1 is less than 1 MHz, is preferably less than 300 kHz and is more preferably less than 200 kHz.

In order to heat with the second pulse train L2 after the modification by the first pulse train L1, it is necessary to arrange at least one pulse of the second pulse train L2, between the pulses of the first pulse train L1. Hence, when the repeated frequency f10 of the first pulse train L1 is equal to or less than 1 MHz, the repeated frequency f20 of the second pulse train L2 is preferably equal to or more than 500 kHz. When the repeated frequency f10 of the first pulse train L1 is equal to or less than 300 kHz, the repeated frequency f20 of the second pulse train L2 is preferably equal to or more than 300 kHz. When the repeated frequency f10 of the first pulse train L1 is equal to or less than 200 kHz, the repeated frequency f20 of the second pulse train L2 is preferably equal to or more than 200 kHz.

What has been described above is about the welding of the laser light wavelength with the transparent glass plates meeting each other; it is also possible to perform overlapping welding. In order for the focused spot Si to be formed in the overlapping portion (the portion where the upper glass plate and the lower glass plate overlap each other, that is, a position the thickness of the upper glass plate inwardly from the upper surface thereof), the distance between the lens 20 and the upper glass plate is preferably adjusted.

With the pulse train L3 output from the pulse laser device of the present embodiment, in addition to the welding of the transparent material described above, it is possible to anneal a transparent material.

Since a transparent thin film has poor crystallization with the film remaining formed, it is necessary to increase the crystallization by annealing it. The absorption rate of the thin film material is increased with the pulses of the first pulse train, and annealing is performed by heating resulting from the pulses of the second pulse train.

Second Embodiment

Figure 5:
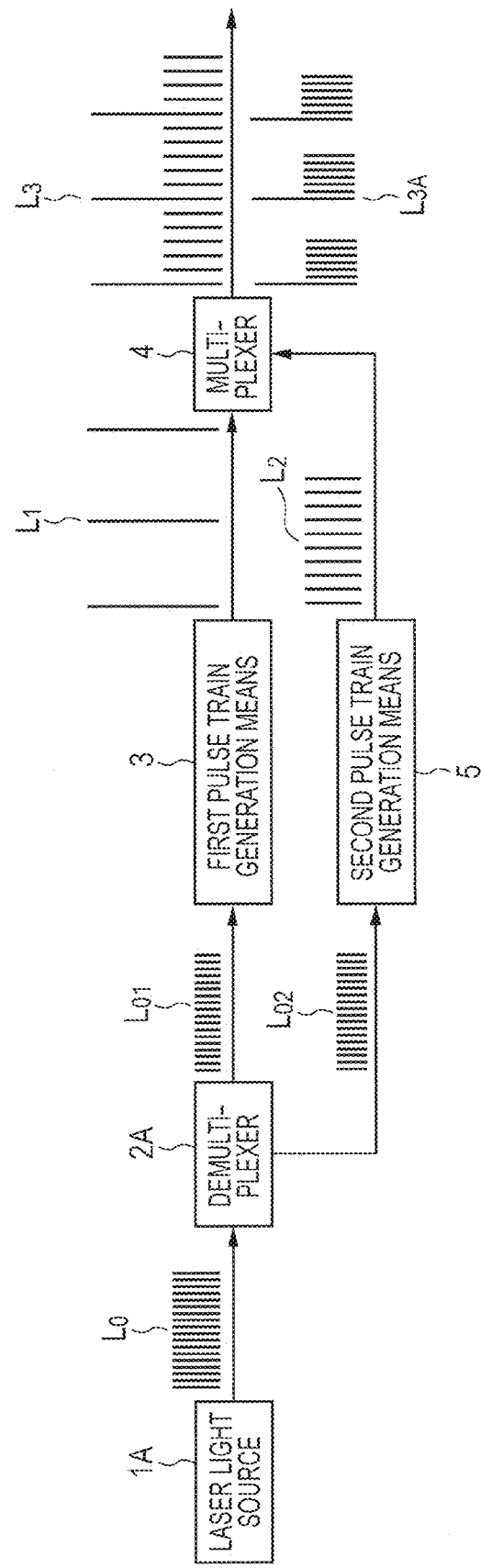
FIG. 5 is a block diagram of a pulse laser device of a second embodiment.

As shown in FIG. 5, the pulse laser device of the present embodiment greatly differs from the pulse laser device of the first embodiment in that second pulse train generation means 5 parallel to the first pulse train generation means 3 is provided between a demultiplexer 2A and the multiplexer 4.

Figure 6:
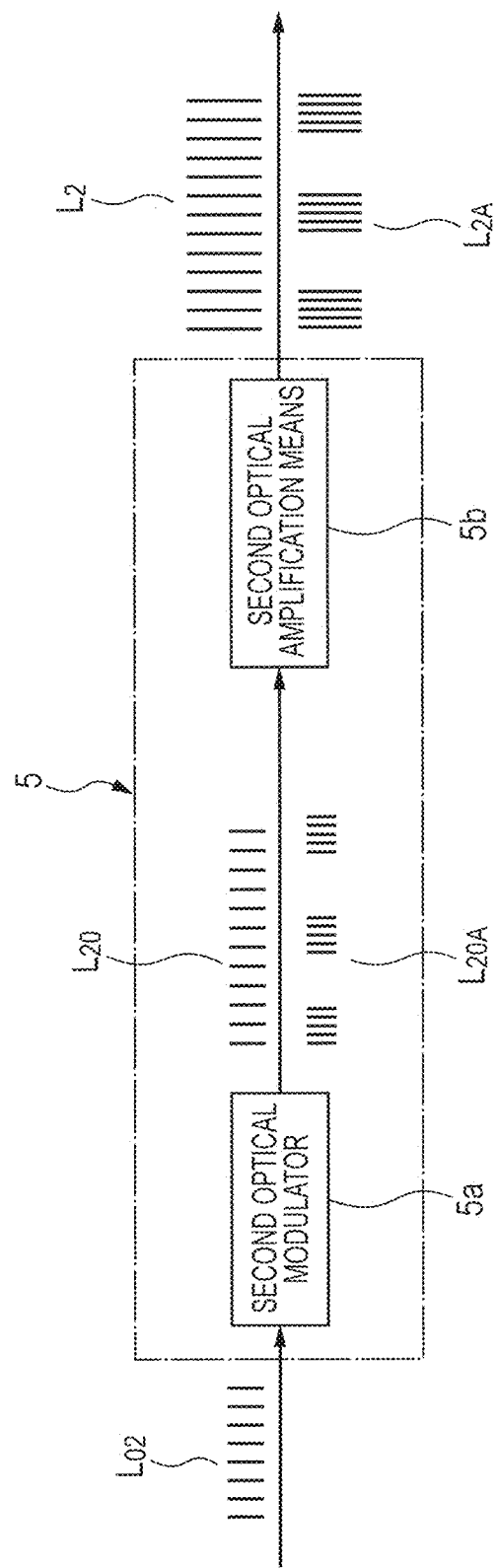
FIG. 6 is a detailed block diagram of second pulse train generation means of FIG. 5.

As shown in FIG. 6, the second pulse train generation means 5 includes: a second optical modulator 5a that changes the repeated frequency f0 of the second seed pulse train L02 into a frequency f2 which is lower than f0; and second optical amplification means 5b that amplifies the peak power P02 of the second seed pulse train L02 to a peak power P2 which is greater than P02.

As the second optical modulator 5a, an acousto-optic (AOM), an electro-optic modulator (EOM), a magneto-optic modulator (MOM) or the like can be used.

The second optical amplification means 5b includes an optical amplifier. When the optical amplifier is a fiber amplifier, an expander that expands a pulse time width is preferably included before the fiber amplifier in order to prevent saturation. As the expander, an optical element, such as a fiber, a chirped grating or a chirped fiber grating, that chirps the incident optical pulse and expands the pulse width is used. In this case, the amount of expansion of the pulse is set equal to, for example, the amount of expansion by the first amplification means. In this way, the first pulse train L1 and the second pulse train L2 compressed by adjusting the chirp with chirp adjustment means finally have the same pulse time width.

The operation of the pulse laser device of the present embodiment will now be described. The seed pulse train L0 of the peak power P0 and the repeated frequency f0 output from a laser light source 1A is demultiplexed by the demultiplexer 2 into the first seed pulse train L01 of the peak power P01 and the repeated frequency f0 and the second seed pulse train L02 of the peak power P02 and the repeated frequency f0.

The pulses of the first seed pulse train L01 are thinned out by the first optical modulator 3a, and thus the first seed pulse train L01 becomes the pulse train L10 of the repeated frequency f1 (<f0). The pulse train L10 is amplified by the first optical amplification means 3b into the first pulse train L1 of the peak power P1 (>P0) (see FIG. 2).

The pulses of the second seed pulse train L02 are thinned out by the second optical modulator 5a, and thus the second seed pulse train L02 becomes the pulse train L20 of the repeated frequency f2 (>f1). The pulse train L20 is amplified by the second optical amplification means 5b into the second pulse train L2 of the peak power P2 (<P1) (see FIG. 6).

The first pulse train L1 and the second seed pulse train L2 are multiplexed by the multiplexer 4 into the pulse train L3 in which the second pulse train L2 is superimposed on the first pulse train L1.

In the present embodiment, a picosecond pulse laser light source 1A is used that outputs the seed pulse train L0 of the peak power P0=40 W, the repeated frequency f0=50 MHz, the pulse width τ0=10 ps and the average power P0=20 mW.

When, as the demultiplexer 2A, a demultiplexer that performs demultiplexing in a ratio of 50:50 is used, the peak power P01 of the first seed pulse train L01 is 20 W, and the peak power P02 of the second seed pulse train L02 is 20 W.

When, as the first optical modulator 3a, a modulator that thins out the repeated frequency f0=50 MHz of the first seed pulse train L01 into 100 kHz is used, the repeated frequency f10 of the pulse train L10 becomes equal to 100 kHz.

When, as the first optical amplification means 3b, an amplifier having an amplification of 10000 is used, the peak power P1 of the first pulse train L1 becomes equal to 1 Mw.

When, as the second optical modulator 5a, a modulator that thins out the repeated frequency f0=50 MHz of the second seed pulse train L02 into 5 MHz is used, the repeated frequency f20 of the pulse train L20 becomes equal to 5 MHz.

When, as the second optical amplification means 5b, an amplifier having an amplification of 1000 is used, the peak power P2 of the second pulse train L2 becomes equal to 20 kW.

Therefore, the pulse train L3 output from the pulse laser device of the present embodiment is a pulse train in which the second pulse train L2 of the repeated frequency f20=5 MHz and the peak power P2=20 kW is superimposed on the first pulse train L1 of the repeated frequency f10=100 kHz and the peak power P1=1 Mw.

The optical modulator is a gate; for example, discontinuous thinning out can be performed by the second optical modulator 5a into a pulse train L20A (see FIG. 6). Then, in a pulse train L3A output from the pulse laser device, as shown in FIG. 5, there is a room between the pulses of the first pulse train L1. Hence, even if five pulses of the second pulse train L2 need to be inserted between the pulses of the first pulse train L1, they can be sufficiently inserted.

Third Embodiment

Figure 7:
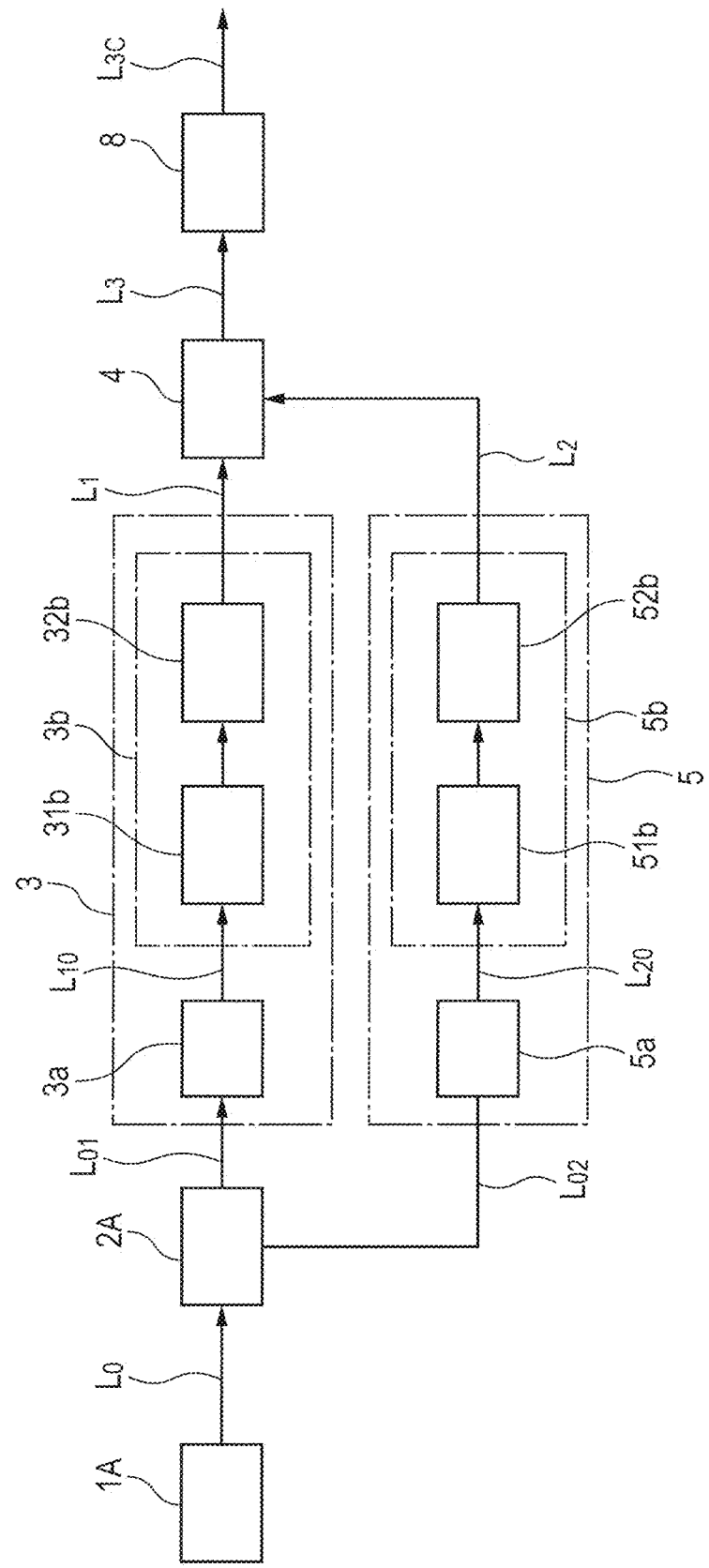
FIG. 7 is a block diagram of a pulse laser device of a third embodiment.

As shown in FIG. 7, the pulse laser device of the present embodiment greatly differs from the pulse laser device of the second embodiment in that chirp adjustment means 8 is provided after the multiplexer 4. The pulse laser device of the present embodiment is designed to produce the second pulse train having a time width longer than the first pulse train of the second embodiment.

The first pulse train generation means 3 includes: the first optical modulator 3a that changes the repeated frequency f0 of the first seed pulse train L01 into the frequency f1 which is lower than f0; and the first optical amplification means 3b that amplifies the peak power P01 of the first seed pulse train L01 to the peak power P1 which is greater than P01.

The first optical amplification means 3b includes an expander 31b and an amplifier 32b.

The second pulse train generation means 5b includes: the second optical modulator 5a that changes the repeated frequency f0 of the second seed pulse train L02 into the frequency f2 which is lower than f0; and the second optical amplification means 5b that amplifies the peak power P02 of the second seed pulse train L02 to the peak power P2 which is greater than P02.

The second optical amplification means 5b includes an expander 51b and an amplifier 52b. The amount of expansion of the pulse by the expander 51b of the second optical amplification means 5b is set different from the amount of expansion of the pulse by the expander 31b of the first optical amplification means 3b. Then, when the chirp is adjusted such that the first pulse train L1 becomes the minimum time width, the pulse time width of the second pulse train L2 at the time when the chirp is adjusted by the chirp adjustment means 8 after the first pulse train L1 and the second pulse train L2 are multiplexed by the multiplexer 4 is not sufficiently compressed. Alternatively, the pulse time width is expanded in a reverse chirp direction. In other words, preferably, when the peak power before the chirp adjustment of the second pulse train L2 is sufficiently low with respect to a saturated/nonlinear peak power of the amplifier, the amount of expansion of the second pulse train L2 is made lower than the amount of expansion of the first pulse train L2 whereas, when the peak power of the second pulse train L2 is high, the amount of expansion thereof is made higher than the amount of expansion of the first pulse train L1. In this way, since, finally, the first pulse train L1 that is output from the chirp adjustment means 8 optimized to compress the first pulse train L1 most becomes ultra-short pulses, and the second pulse train L2 becomes long pulses, it is possible to mix the pulses having two types of time widths within the same optical axis. In other words, a pulse train L3C output from the pulse laser device of the present embodiment becomes pulses in which a long pulse laser is superimposed on an ultra-short pulse laser.

As the expander 31b and 51b, an optical element, such as a fiber, a chirped grating or a chirped fiber grating, that chirps the incident optical pulse to expand the pulse width is used.

As the chirp adjustment means 8, a diffraction grating pair, a chirped grating, a bragg grating or the like is used.

The operation of the pulse laser device of the present embodiment will now be described. The seed pulse train L0 of the peak power P0 and the repeated frequency f0 output from the laser light source 1A is demultiplexed by the demultiplexer 2A into the first seed pulse train L01 of the peak power P01 and the repeated frequency f0 and the second seed pulse train L02 of the peak power P02 and the repeated frequency f0.

The pulses of the first seed pulse train L01 are thinned out by the first optical modulator 3a, and thus the first seed pulse train L01 becomes the pulse train L10 of the repeated frequency f1 (<f0). The pulse train L10 is expanded by the expander 31b and is then amplified by the optical amplifier 32b into the first pulse train L1 of the peak power P1 (>P0).

The pulses of the second seed pulse train L02 are thinned out by the second optical modulator 5a, and thus the second seed pulse train L02 becomes the pulse train L20 of the repeated frequency f2 (>f1). The pulse train L20 is expanded by the expander 51b and is then amplified by the optical amplifier 52b into the second pulse train L2 of the peak power P2 (<P1).

The first pulse train L1 and the second pulse train L2 are multiplexed by the multiplexer 4 into the pulse train L3 in which the second pulse L2 is superimposed on the first pulse train L1; by passing through the common chirp adjustment means 8, the first pulse train L1 is compressed down to ultrashort pulses, and the second pulse train L2 is not sufficiently compressed or has the reverse chirp and thereby has a time width longer than the first pulse train L1.

In the present embodiment, a femtosecond pulse laser light source 1A is used that outputs the seed pulse train L0 of the peak power P0=40 W, the repeated frequency f0=50 MHz, the pulse width τ0=500 fs and the average power P0=20 mW.

When, as the demultiplexer 2A, a demultiplexer that performs demultiplexing in a ratio of 50:50 is used, the peak power P01 of the first seed pulse train L01 is 20 W, and the peak power P02 of the second seed pulse train L02 is 20 W.

When, as the first optical modulator 3a, a modulator that thins out the repeated frequency f0=50 MHz of the first seed pulse train L01 into 100 kHz is used, the repeated frequency f10 of the pulse train L10 becomes equal to 100 kHz.

When the pulse width of the pulse train L10 is expanded by the expander 31b from 500 fs to 200 ps, and thereafter an amplifier having an amplification of 5000 is used as the amplifier 32b, the peak power P1 of the first pulse train L1 becomes equal to 100 kW.

When, as the second optical modulator 5a, a modulator that thins out the repeated frequency f0=50 MHz of the second seed pulse train L02 into 1 MHz is used, the repeated frequency f20 of the pulse train L20 becomes equal to 1 MHz.

When the pulse width of the pulse train L20 is expanded by the expander 51b from 500 fs to 400 ps, and is thereafter amplified with the amplifier 52b having an amplification of 1000, the peak power P2 of the second pulse train L2 becomes equal to 20 kW.

The pulse trains L1 and L2 are made to pass through the common chirp adjustment means 8, and thus the first pulse train L1 is compressed again to 500 fs whereas the second pulse train L2 is only compressed down to 0.2 ns.

Therefore, the pulse train L3C output from the pulse laser device of the present embodiment is a pulse train in which the second pulse train L2 of the repeated frequency f20=1 MHz, the pulse time width=0.2 ns and the peak power P2=20 kW is superimposed on the first pulse train L1 of the repeated frequency f10=100 kHz, the pulse time width=500 fs and the peak power P1=100 kW.

Fourth Embodiment

Figure 8:
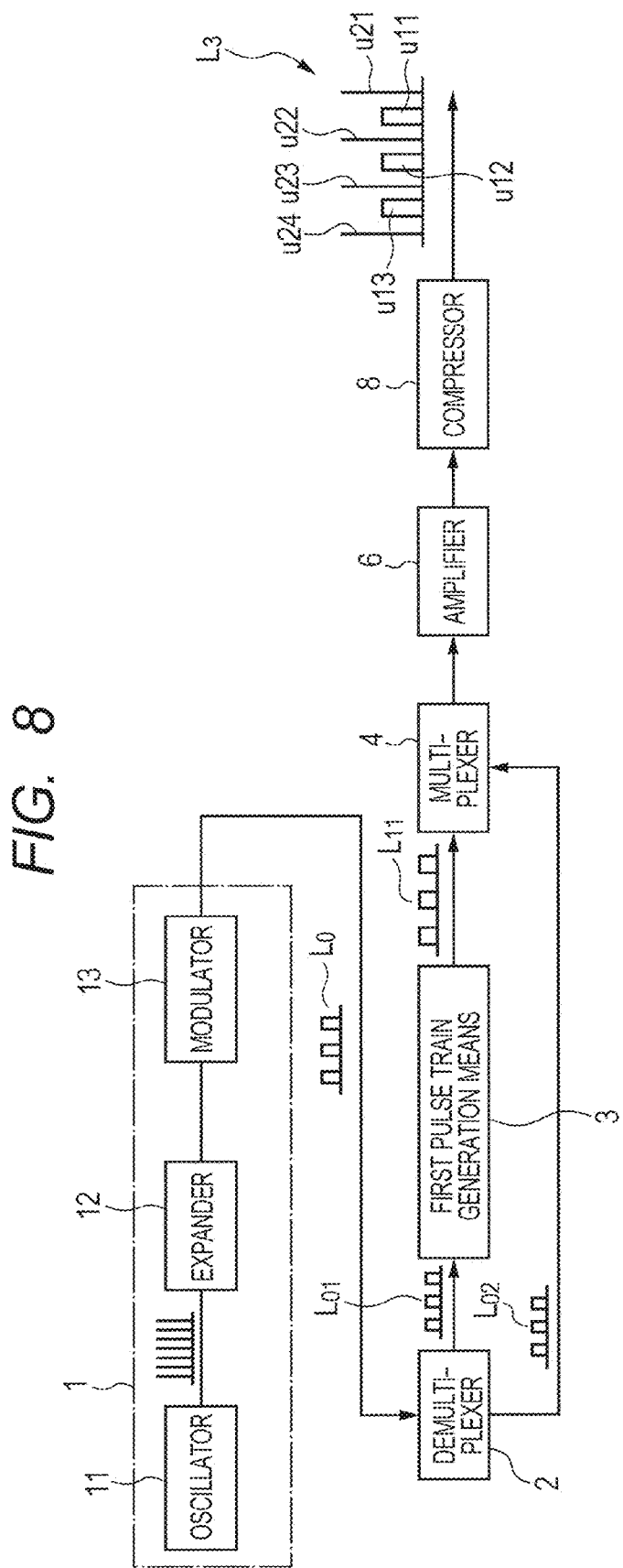
FIG. 8 is a block diagram of a pulse laser device of a fourth embodiment.

As shown in FIG. 8, the pulse laser device of the present embodiment includes: the laser light source 1 that outputs a repeated pulse laser; the demultiplexer 2 that demultiplexes the pulse laser L0 output from the laser light source 1 into two pulse lasers L01 and L02; the first pulse train generation means that changes at least the peak power and/or the pulse width of the pulse laser L01 among the pulse lasers L01 and L02 demultiplexed by the demultiplexer 2 to generate a first pulse train L11; and the multiplexer 4 that multiplexes the pulse laser L02 among the two pulse lasers L01 and L02 demultiplexed by the demultiplexer 2 and the first pulse train L11 generated by the first pulse train generation means 3.

The laser light source 1 of the present embodiment includes: an expander that expands the pulse width of the repeated pulse laser output from a laser oscillator 11; and a modulator 13 that reduces the repeated frequency.

The first pulse train generation means 3 of the present embodiment includes an expander, and the pulse laser L01 is changed into the pulse train L11 having a larger pulse width.

The pulse laser device of the present embodiment includes an amplifier 6 and a compressor 8 after the multiplexer 4.

The pulse train L11 is amplified by the amplifier 6, its pulse width is compressed by the compressor 8 and the pulse train L11 becomes pulses u11, u12, u13, . . . .

The pulse laser L02 is amplified by the amplifier 6, its pulse width is compressed by the compressor 8 and the pulse laser L02 becomes pulses u21, u22, u23, . . . .

The laser properties (the repeated frequency, the pulse width and the average power) of the laser oscillator 11, the expansion rate of an expander 12 and a modulation rate of the modulator 13 are appropriately selected, and thus a predetermined seed pulse L0 can be output. The expansion rate of the expander of the first pulse train generation means 3, the multiplexing rate of the multiplexer 4, the amplification rate of the amplifier 6 and the compression rate of the compressor 8 are appropriately selected, and thus the pulse laser device of the present embodiment can output, for example, the pulse laser L3 in which the pulses (u11, u12, u13, . . . ) having a pulse width of 1 ns, a pulse energy of 2 μJ, a repeated frequency of 1 MHz and an average power of 2 W are superimposed on the pulses (u21, u22, u23, . . . ) having a pulse width of 500 fs, a pulse energy of 0.5 μJ, a repeated frequency of 1 MHz and an average power of 0.5 W.

In the pulse laser output from the pulse laser device of the present embodiment, the high-peak power ultra-short pulse u21 whose pulse width is 500 fs is output, then the long pulse u11 whose pulse width is 1 ns is output and then the pulse u22 is output following the pulse u11. For example, the fiber length (the optical path length) immediately before the multiplexer is changed, and thus it is possible to adjust a time delay d from u21 to u11. Hence, in the pulse laser device of the present embodiment, since the repeated frequency of each pulse is 1 MHz, the time delay d can be adjusted within an inequality of −0.5 μs<d<0.5 μs.

Figure 9:
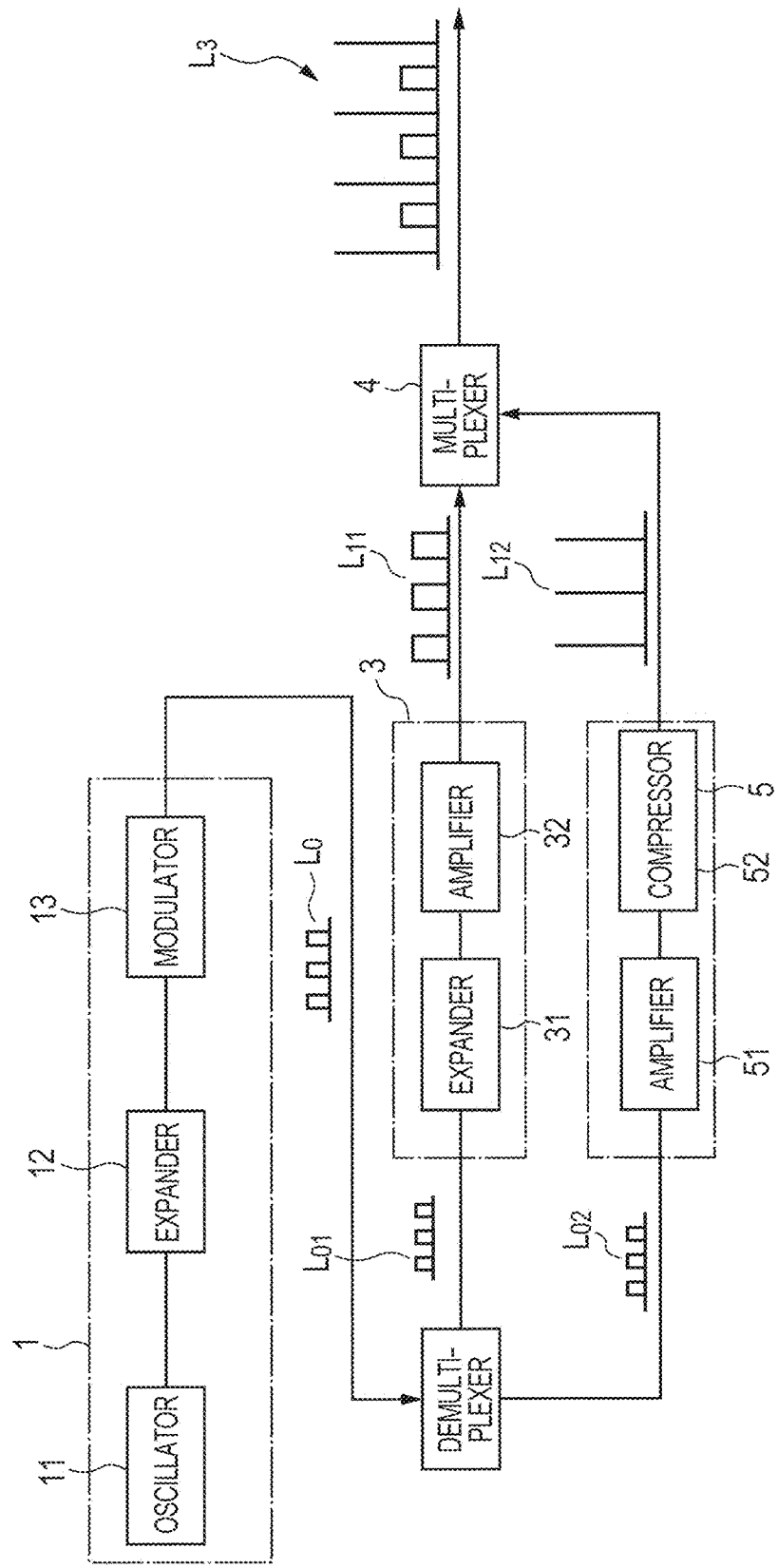
FIG. 9 is a block diagram of a variation of the pulse laser device of the fourth embodiment.

A variation of the pulse laser device of the present embodiment is shown in FIG. 9. In the pulse laser device of the variation, the first pulse train generation means 3 includes an amplifier 32 after an expander 31. The second pulse train generation means 5 that generates a second pulse train L12 from the pulse laser L02 is also included.

The first pulse train generation means 3 includes the expander 31 and the amplifier 32, and expands the pulse width of the pulse laser L01 among the two pulse lasers L01 and L02 demultiplexed by the demultiplexer 2, amplifies the power to generate the first pulse train L11. The second pulse train generation means 5 includes an amplifier 51 and a compressor 52, and amplifies the power of the pulse laser L02, compresses the pulse width to generate the second pulse train L12.

The first pulse train L11 and the second pulse train L12 are multiplexed by the multiplexer 4, and thereby become a pulse laser L13 in which the repeated low peak power pulse laser L11 is superimposed on the repeated high-peak power ultrashort pulse laser L12.

EXAMPLE 1

Figure 10:
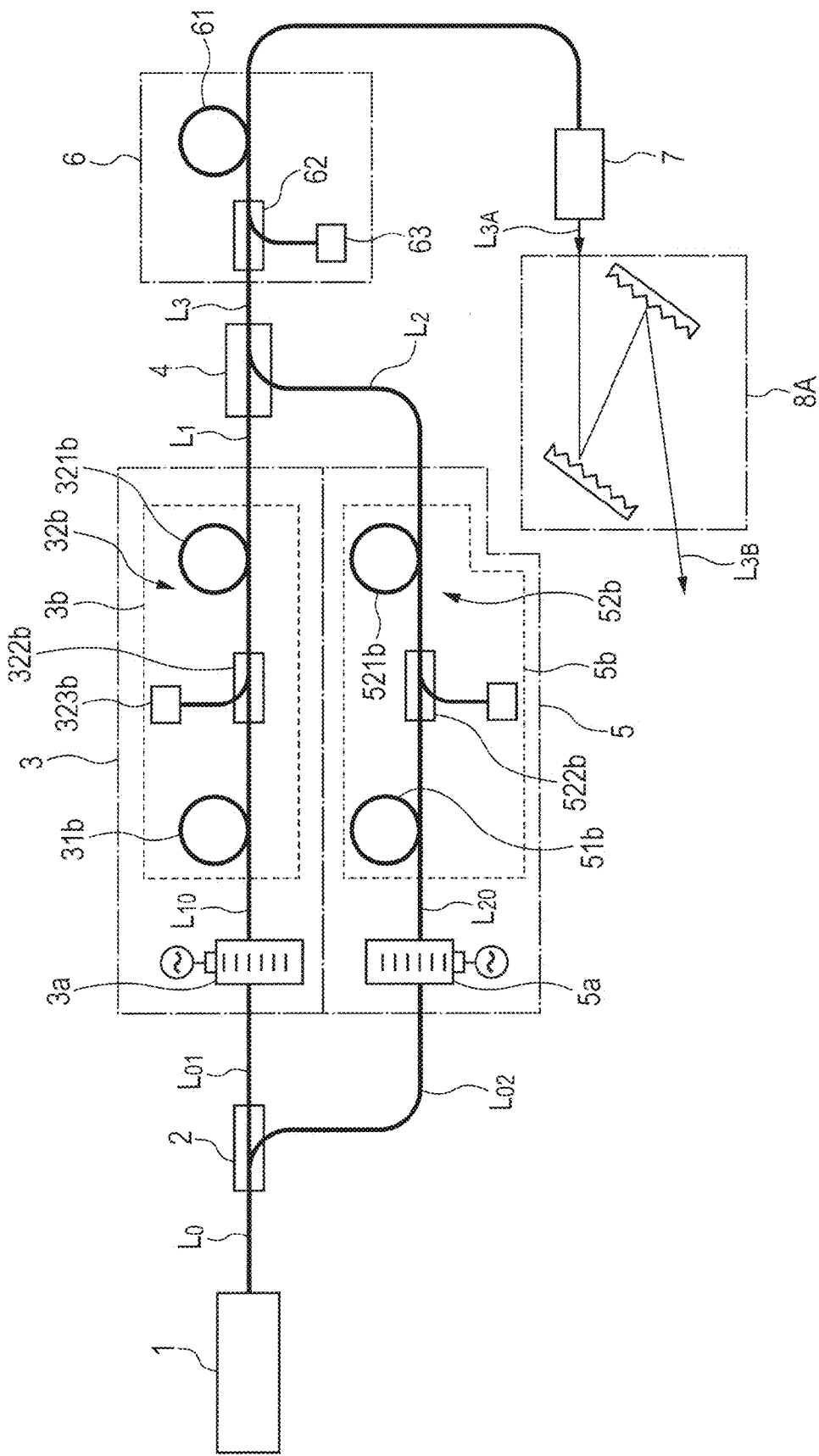
FIG. 10 is a schematic diagram showing the configuration of a pulse laser device of example 1.

The pulse laser device of the present example includes, as shown in FIG. 10, the laser light source 1, the demultiplexer 2, the first pulse train generation means 3, the second pulse train generation means 5 and the multiplexer 4. The pulse laser device of the present example includes the amplifier 6 that amplifies the pulse train L3 obtained by multiplexing, a collimator 7 that collimates the pulse train guided through the fiber and a diffraction grating pair 8A that adjusts the chirp of the collimated pulse train.

The laser light source 1 is a mode-locked fiber laser, and outputs the seed pulse train L0 having a pulse width of 150 fs, a repeated frequency of 50 MHz, an average power of 10 mW (a peak power of 1.33 kW, a pulse energy of 0.2 nJ) and a wavelength of 1.0 μm.

The demultiplexer 2 is a fiber multiplexer, and performs demultiplexing in a ratio of 50:50. Hence, both the peak powers of the first seed pulse train L01 and the second seed pulse train L02 are 0.67 kW. Both the average powers of the first seed pulse train L01 and the second seed pulse train L02 are 5 mW.

The first optical modulator 3a is an acousto-optic modulator, and performs modulation from 50 MHz into 100 kHz. Hence, the average power of the pulse train L10 is 10 μW.

The first optical amplification means 3b includes the expander 31b that expands the pulse width so as to prevent the saturation of the amplifier 32b.

The expander 31b is a quartz fiber having a core diameter of 6 μm and a length of 500 m, has a GVD of 50 ps/nm·km and expands the pulse width from 150 fs to 100 ps.

The amplifier 32b includes a Yb doped fiber 321b having a core diameter of 30 μm, an excitation semiconductor laser 323b and a wavelength multiplexing coupler 322b; its amplification is 1000 (the amplification is performed from 10 μW to 10 mW).

The second optical modulator 5a is also an acousto-optic modulator; this modulator performs modulation from 50 MHz into 5 MHz. Hence, the average power of the pulse train L20 is 0.5 mW.

The second optical amplification means 5b also includes the expander 51b that expands the pulse width so as to prevent the saturation of the amplifier 52b.

The expander 51b is the same as the expander 31b, and expands the pulse width from 150 fs to 100 ps.

The amplifier 52b includes a Yb doped fiber 521b having a core diameter of 30 μm, an excitation semiconductor laser 523b and a wavelength multiplexing coupler 522b; its amplification is 10 (the amplification is performed from 0.5 mW to 5 mW).

The multiplexer 4 is the same fiber multiplexer as the demultiplexer 2, and multiplexes the first pulse train L1 and the second pulse train L2 to output the pulse train L3.

The amplifier 6 includes a Yb doped fiber 61 having a core diameter of 30 μm, an excitation semiconductor laser 63 and a wavelength multiplexing coupler 62; its amplification is 100 (the amplification is performed from 5 mW to 500 mW or from 10 mW to 1 W).

The collimator 7 includes a lens system, and changes a pulse train emitted from a fiber end surface into the pulse train L3A of a parallel beam.

The diffraction grating pair 8A adjusts the chirp of an incident optical pulse, and compresses the pulse width expanded by the expanders 31b and 51b from 150 fs to 100 ps, to 500 fs.

As is obvious from the above description, a pulse train L3B output from the diffraction grating pair 8A is a pulse train in which a pulse train having a repeated frequency of 5 MHz, a pulse width of 500 fs and an average power of 500 mW (a peak power of 20 kW, a pulse energy of 0.1 μJ) is superimposed on a pulse train having a repeated frequency of 100 kHz, a pulse width of 500 fs and an average power of 1 W (a peak power of 2 MW, a pulse energy of 10 μJ).

EXAMPLE 2

Figure 11:
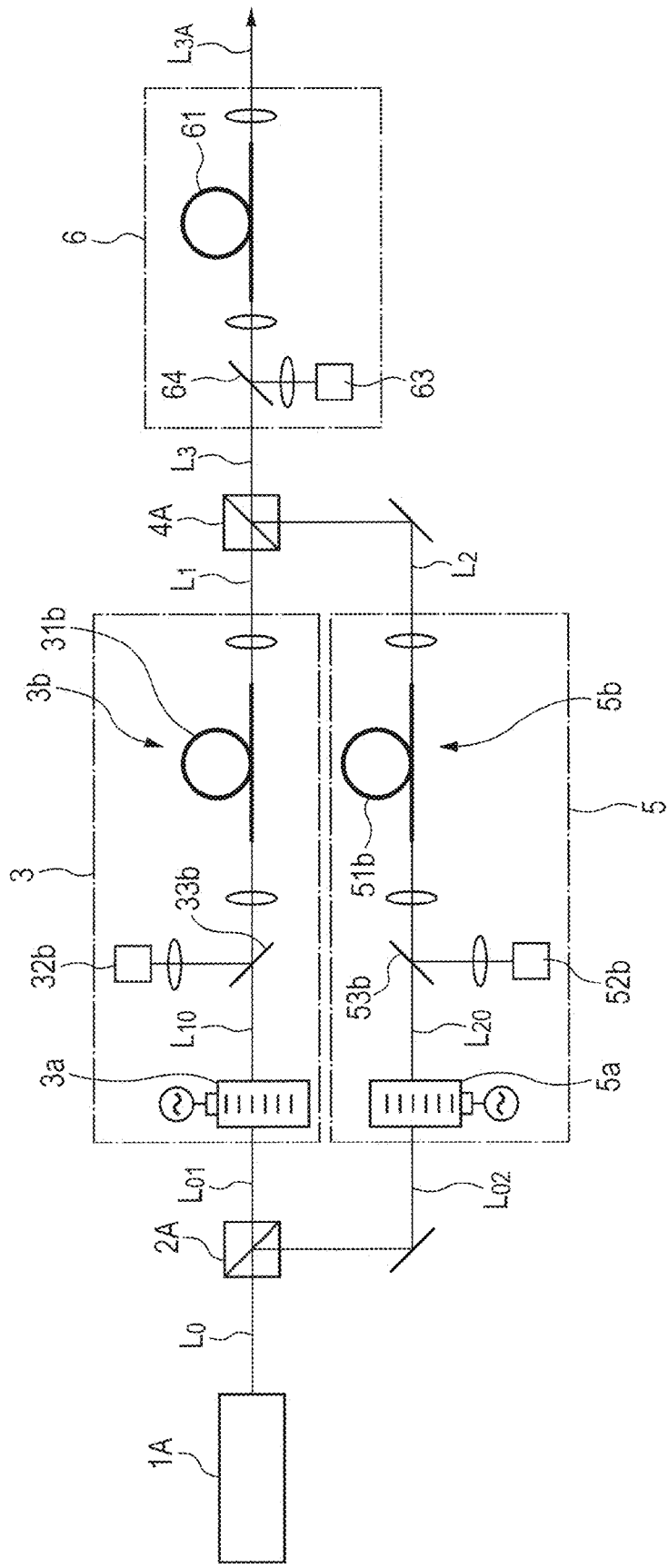
FIG. 11 is a schematic diagram showing the configuration of a pulse laser device of example 2.

The pulse laser device of the present example shown in FIG. 11 greatly differs from that of example 2 in that the components other than the amplifier are formed with bulk optical components. It also differs from that of example 1 in that, as the laser light source 1, a laser which outputs a picosecond pulse train is used, and that the diffraction grating pair 8A which is the chirp adjustment means is omitted.

The laser light source 1A is a mode-locked fiber laser, and outputs the seed pulse train L0 having a pulse width of 10 ps, a repeated frequency of 50 MHz, an average power of 20 mW (a peak power of 400 W, a pulse energy of 0.4 nJ) and a wavelength of 1 μm.

The demultiplexer 2 is a beam splitter, and performs demultiplexing in a ratio of 50:50. Hence, both the peak powers of the first seed pulse train L01 and the second seed pulse train L02 are 200 W. Both the average powers of the first seed pulse train L01 and the second seed pulse train L02 are 10 mW. Both the pulse energies of the first seed pulse train L01 and the second seed pulse train L02 are 0.2 nJ.

The first optical modulator 3a is an acousto-optic modulator, and performs modulation from 50 MHz into 100 kHz. Hence, the average power of the pulse train L10 is 0.02 mW.

The amplifier 3b includes a Yb doped fiber 31b having a core diameter of 30 μm, an excitation semiconductor laser 32b and a two-color mirror 33b; its amplification is 250 (the amplification is performed from 0.02 mW to 5 mW).

The second optical modulator 5a is an acousto-optic modulator, and performs modulation from 50 MHz into 5 MHz. Hence, the average power of the pulse train L20 is 1 mW.

The amplifier 5b includes an Er doped fiber 51b having a core diameter of 30 μm, an excitation semiconductor laser 52b and a two-color mirror 53b; its amplification is 10 (the amplification is performed from 1 mW to 10 mW).

The multiplexer 4A is the same beam splitter as the demultiplexer 2A, and multiplexes the first pulse train L1 and the second pulse train L2 to output the pulse train L3.

The amplifier 6 includes a Yb doped fiber 61 having a core diameter of 30 μm, an excitation semiconductor laser 63 and a two-color mirror 62; its amplification is 100 (the amplification is performed from 5 mW to 500 mW or from 10 mW to 1 W).

As is obvious from the above description, a pulse train L3A output from the amplifier 6 is a pulse train in which a pulse train having a repeated frequency of 5 MHz, a pulse width of 10 ps and an average power of 1 W (a peak power of 20 kW, a pulse energy of 0.2 μJ) is superimposed on a pulse train having a repeated frequency of 100 kHz, a pulse width of 10 ps and an average power of 500 mW (a peak power of 0.5 MW, a pulse energy of 5 μJ).

Verification Experiment of Transparent Member Welding Method

In a Case where a Gap was Present

In order to find out the effects of the combination of femtosecond/nanosecond pulses, first, a welding comparison experiment on a glass having a gap (space) between overlapping interfaces obtained by overlapping two transparent glasses was performed.

The glass used in this comparison experiment was a soda glass having a thickness of 2 mm. The two glass plates were overlapped to have a gap of about 2 µm. The laser light was incident from a surface opposite to the interface of one of the glasses overlapped; the position of a collective lens (an objective lens having a magnification of 20, NA=0.4) was adjusted such that focus was formed on the glass interface.

Figure 12:
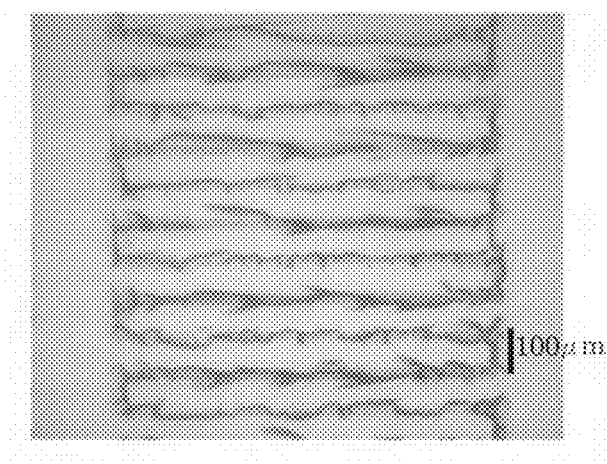
FIG. 12 is a microscope photograph when only a femtosecond pulse laser is focused and irradiated to the interface of a transparent glass having a gap.

FIG. 12 is a microscope photograph obtained by shooting, from above, the glass plate when a femtosecond pulse laser having an average output of 1 W, a repeated frequency of 1 MHz, a pulse energy of 1 µJ, a pulse time width of 500 fs and a peak power of 2 MW was focused and irradiated at a scanning speed of 10 mm/s.

FIG. 12 shows that cracks only occurred in the surface facing the glass interface and welding was not achieved. In other words, when the gap was present in the interface, the irradiation of the femtosecond pulses alone did not allow welding.

Figure 13:
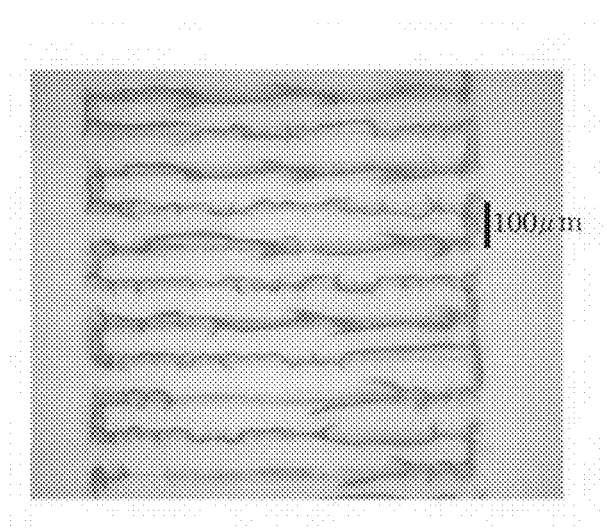
FIG. 13 is a microscope photograph when the femtosecond pulse laser is irradiated to the interface of the transparent glass having the gap and thereafter a nanosecond pulse laser is focused and irradiated.

FIG. 13 is a microscope photograph obtained by shooting, from above, the glass plate when a nanosecond pulse laser having an average output of 2 W, a repeated frequency of 1 MHz, a pulse energy of 2 µJ, a pulse time width of 1 ns and a peak power of 2 KW was focused and irradiated to the glass interface in the state of FIG. 12 (after the irradiation of the femtosecond pulse laser) at a scanning speed of 10 mm/s.

FIG. 13 shows that welding was not achieved even by the application of the nanosecond laser after the occurrence of the cracks resulting from the application of the femtosecond pulse laser to the interface. In other words, with the welding method (see Japanese Patent Application Laid-open No. 2005-1172) of irradiating the nanosecond laser after the occurrence of the cracks in the glass interface resulting from the femtosecond pulse laser, it was impossible to achieve welding.

Figure 14:
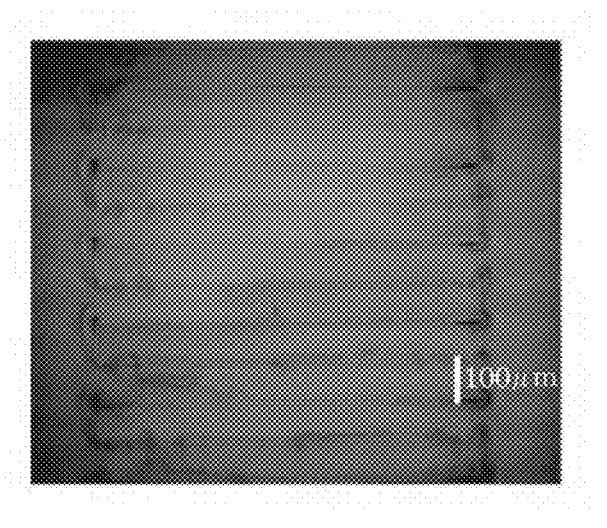
FIG. 14 is a microscope photograph when a pulse laser in which the nanosecond pulse laser is superimposed on the femtosecond pulse laser is focused and irradiated to the interface of the transparent glass having the gap.

FIG. 14 is a microscope photograph obtained by shooting, from above, the glass plate when a pulse laser in which a nanosecond pulse laser was superimposed on a femtosecond pulse laser output from the pulse laser device of the fourth embodiment was focused and irradiated to the glass interface at a scanning speed of 10 mm/s. In other words, the femtosecond pulse laser is a pulse laser having an average output of 0.5 W, a repeated frequency of 1 MHz, a pulse energy of 0.5 µJ, a pulse time width of 500 fs and a peak power of 1 MW; the nanosecond pulse laser is the same as the nanosecond pulse laser described above. In the pulse laser device of the fourth embodiment, a time delay from the femtosecond pulse to the nanosecond pulse was set to 0.5 ns by adjusting the optical path length between the demultiplexer 2 and the multiplexer 4.

FIG. 14 shows that, when the pulse laser in which the nanosecond pulse laser was superimposed on the femtosecond pulse laser was irradiated, the entire glass surface appears dark, and a black band-shaped pattern (welding bead?) on which a slight laser spot was scanned is seen. The reason why the entire glass surface appears dark is that the gap in the interface disappeared by the welding of the glass and there was no reflective light from the interface. Hence, it is verified that the pulse laser in which the nanosecond pulse laser was superimposed on the femtosecond pulse laser was irradiated, and thus welding was satisfactorily performed even with the gap (space) in the interface.

Although FIGS. 12 to 14 are the microscope photographs obtained by shooting the glass plates overlapped as described above, when the samples were observed by the naked eye, in the samples of FIGS. 12 and 13, an interference pattern was clearly observed and the gap was left in the interface. It is found that, in the sample of FIG. 14, no interference pattern around a laser irradiation portion was observed, and the gap disappeared by the welding.

In the laser irradiation in the optical system, a threshold value for the processing with the femtosecond pulse was between 0.5 to 1.0 µJ; in the case of FIG. 14, plasma was produced by the femtosecond pulse energy but the processing was not achieved with the femtosecond itself (after the irradiation, no permanent material modification occurred). It was determined that a threshold value for the processing with the nanosecond pulse was 2 µJ or more and that the processing was not achieved at all with the nanosecond itself. In other words, it was found that, at least in several hundreds of picoseconds after the irradiation of the femtosecond pulse of the processing threshold value or less, the transient material modification occurred, and, during that time, the nanosecond pulse laser could be effectively absorbed by the irradiation of the nanosecond pulse.

In a Case where No Gap was Present

Then, a comparison experiment on the welding in a state (an interference space<150 nm) where the two glass plates were in full contact with each other was performed. The experimental conditions were the same as in the case where a gap was present, except that the glass plates were in full contact with each other.

Figure 15:
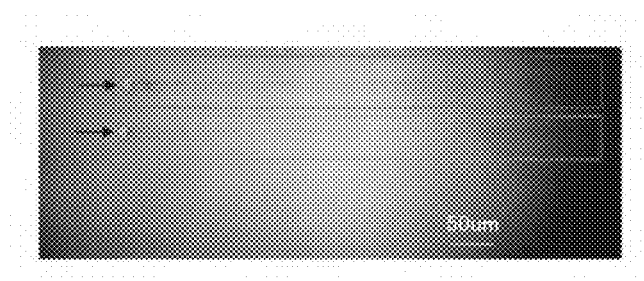
FIG. 15 is a microscope photograph when only the femtosecond pulse laser is irradiated to the interface of a transparent glass having no gap and when only the femtosecond pulse laser is focused and irradiated and thereafter the nanosecond pulse laser is focused and irradiated.

FIG. 15 is a microscope photograph obtained by shooting, from above, the glass plate after the focusing and irradiation of a laser pulse. In the direction of an arrow above, a femtosecond pulse laser having an average output of 1 W, a repeated frequency of 1 MHz, a pulse energy of 1 µJ, a pulse time width of 500 fs and a peak power of 2 MW was focused and irradiated at a scanning speed of 10 mm/s. After the irradiation of the above femtosecond pulse laser, in the direction of an arrow below, a nanosecond pulse laser having an average output of 2 W, a repeated frequency of 1 MHz, a pulse energy of 2 µJ, a pulse time width of 1 ns and a peak power of 2 KW was focused and irradiated at a scanning speed of 10 mm/s.

Figure 16:
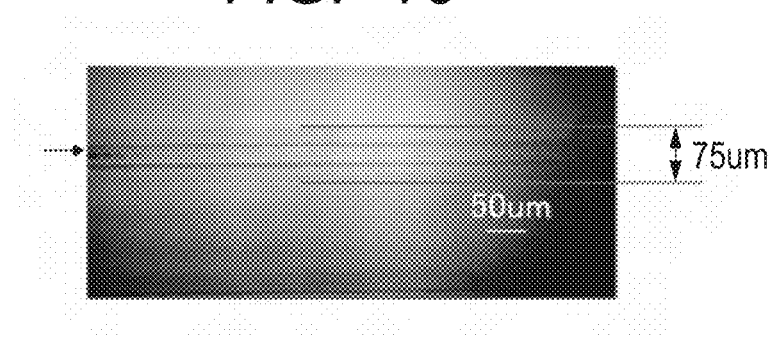
FIG. 16 is a microscope photograph when the pulse laser in which the nanosecond pulse laser is superimposed on the femtosecond pulse laser is focused and irradiated to the interface of the transparent glass having no gap.

FIG. 16 is a microscope photograph obtained by shooting, from above, the glass plate when a pulse laser in which a nanosecond pulse laser was superimposed on a femtosecond pulse laser was focused and irradiated at a scanning speed of 10 mm/s.

It is found that a welding bead was observed in the direction of the arrow above of FIG. 15, and that, in the case where no gap was present, welding was performed with only the femtosecond pulse laser. However, with only the femtosecond pulse laser, the welding bead width is 20 to 30 µm at best.

As seen in the direction of the arrow below of FIG. 15, it is found that the welding bead width is substantially the same as the case of the femtosecond pulse laser alone. Hence, the phenomenon in which a welding portion serves as an absorbing member to locally absorb the ultra-short pulse laser as disclosed in Japanese Patent Application Laid-open No. 2005-1172 was not observed in the glass.

As seen in the direction of the arrow of FIG. 16, a wide (about 75 µm) welding bead was observed. Hence, it is found that, when a pulse laser in which a nanosecond pulse laser was superimposed on a femtosecond pulse laser was focused and irradiated, as compared with the case of the femtosecond pulse laser alone, the welding bead width became twice as wide. This indicates that, even in welding on a glass interface in intimate contact, with a pulse laser in which a nanosecond pulse laser is superimposed on a femtosecond pulse laser, it is possible to perform powerful welding as compared with the case of a femtosecond pulse laser alone.

When the welding was performed with only a femtosecond pulse laser, a pulse train having a pulse energy of 1 µJ and a repeated frequency of 1 MHz was used this time. However, if welding is performed with a larger pulse energy, a wide welding bead may be obtained even with only a femtosecond pulse laser.

Figure 17:
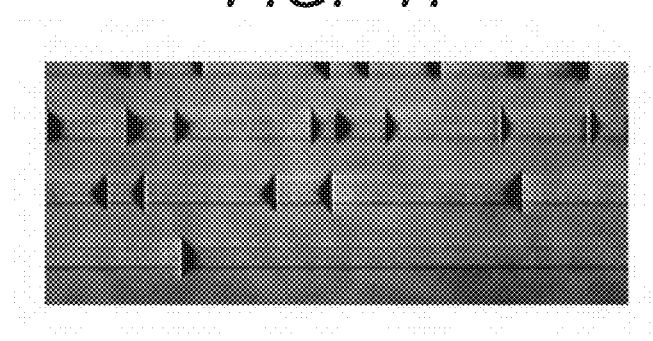
FIG. 17 is a microscope photograph when only a femtosecond pulse laser having twice a pulse energy in the case of FIG. 15 is focused and irradiated to the interface of the transparent glass having no gap.

FIG. 17 is a microscope photograph obtained by shooting, from above, the glass plate when a femtosecond pulse laser having an average output of 2 W, a repeated frequency of 1 MHz, a pulse energy of 2 µJ, a pulse time width of 500 fs and a peak power of 4 MW was focused and irradiated at a scanning speed of 10 mm/s.

FIG. 17 shows that, in the case of a femtosecond pulse laser alone, for example, when welding was performed with the pulse energy doubled to 2 µJ, a crack occurred and, in contrast, the welding strength was lowered.

EXPLANATION OF REFERENCE NUMERALS 1, 1A: laser light source
2, 2A: demultiplexer
3: first pulse train generation means
3a: first optical modulator
31b: expander
4, 4A: multiplexer
5: second pulse train generation means
5A: second optical modulator
51b: expander
8, 8A: chirp adjustment means
L1: first pulse train
L2: second pulse train

The invention claimed is:

1. A pulse laser device comprising:
a laser light source that outputs a repeated pulse laser;
a demultiplexer that demultiplexes the pulse laser output from the laser light source into two pulse lasers;
first pulse train generation means that generates a first pulse train by changing at least a peak power and/or a pulse width of one of the two pulse lasers demultiplexed by the demultiplexer; and
a multiplexer that multiplexes the other of the two pulse lasers demultiplexed by the demultiplexer and the first pulse train generated by the first pulse train generation means,
wherein a pulse laser in which a repeated low-peak power pulse laser is superimposed on a repeated high-peak power ultra-short pulse laser is output.

2. The pulse laser device according to claim 1,
wherein a second pulse train generation means that generates a second pulse train by changing at least a peak power and/or a pulse width of the other of the two pulse lasers demultiplexed by the demultiplexer is included before the multiplexer.

3. The pulse laser device according to claim 1,
wherein the first pulse train generation means includes a first optical modulator that changes a repeated frequency of the pulse laser output from the laser light source into a repeated frequency lower than the repeated frequency.

4. The pulse laser device according to claim 2,
wherein the second pulse train generation means includes a second optical modulator that changes a repeated frequency of the short pulse laser output from the laser light source into a repeated frequency lower than the repeated frequency.

5. The pulse laser device according to claim 3,
wherein at least one of the first pulse train generation means and the second pulse train generation means includes an expander, and further includes, before the multiplexer, chirp adjustment means that adjusts chirp.

6. The pulse laser device according to claim 5,
wherein the first optical modulator changes the repeated frequency into a repeated frequency lower than the repeated frequency of the second optical modulator.

7. The pulse laser device according to claim 5,
wherein the first optical modulator changes the repeated frequency into a repeated frequency of 1 MHz or less.

8. The pulse laser device according to claim 6,
wherein the second optical modulator changes the repeated frequency into a repeated frequency equal to or more than a repeated frequency of the first pulse train.

9. A transparent member welding method comprising:
a laser output step of outputting a pulse laser in which a repeated low-peak power pulse laser is superimposed on a repeated high-peak power ultra-short pulse laser, from a pulse laser device including:
a laser light source that outputs a repeated pulse laser;
a demultiplexer that demultiplexes the pulse laser output from the laser light source into two pulse lasers;
first pulse train generation means that generates a first pulse train by changing at least a peak power and/or a pulse width of one of the two pulse lasers demultiplexed by the demultiplexer; and
a multiplexer that multiplexes the other of the two pulse lasers demultiplexed by the demultiplexer and the first pulse train generated by the first pulse train generation means,
an irradiation step of focusing and irradiating the pulse laser in which the repeated low-peak power pulse laser is superimposed on the repeated high-peak power ultra-short pulse laser output in the laser output step, in a vicinity of a contact portion of two members transparent to a wavelength of the laser;
a modification step of modification of the vicinity of the contact portion by multiphoton absorption with the high-peak power ultra-short pulse laser; and
a melting step of melting, with the low-peak power pulse laser, the vicinity of the contact portion where modification has been performed in the modification step.

10. The transparent member welding method according to claim 9,
wherein the pulse laser device includes second pulse train generation means that generates a second pulse train by changing at least a peak power and/or a pulse width of the other of the two pulse lasers demultiplexed by the demultiplexer before the multiplexer.

11. A transparent member welding apparatus comprising:
a pulse laser device which includes: a laser light source that outputs a repeated pulse laser; a demultiplexer that demultiplexes the pulse laser output from the laser light source into two pulse lasers; first pulse train generation means that generates a first pulse train by changing at least a peak power and/or a pulse width of one of the two pulse lasers demultiplexed by the demultiplexer; and a multiplexer that multiplexes the other of the two pulse lasers demultiplexed by the demultiplexer and the first pulse train generated by the first pulse train generation means, and which outputs a pulse laser in which a repeated low-peak power pulse laser is superimposed on a repeated high-peak power ultra-short pulse laser;

a collective lens which focuses the pulse laser in which the repeated low-peak power pulse laser is superimposed on the repeated high-peak power ultra-short pulse laser output from the pulse laser device, in a vicinity of a contact portion of two members transparent to a wavelength of the laser and which forms a focused spot; and a stage which scans the focused spot.

12. The transparent member welding apparatus according to claim 11, wherein the pulse laser device includes a second pulse train generation means that generates a second pulse train by changing at least a peak power and/or a pulse width of the other of the two pulse lasers demultiplexed by the demultiplexer before the multiplexer.

* * * * *